United States Patent
Yao

(10) Patent No.: US 6,487,336 B1
(45) Date of Patent: Nov. 26, 2002

(54) WDM CHANNEL EQUALIZATION AND CONTROL

(75) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 09/976,404

(22) Filed: Oct. 11, 2001

Related U.S. Application Data

(60) Provisional application No. 60/239,778, filed on Oct. 11, 2000.

(51) Int. Cl.[7] .................................................. G02B 6/28
(52) U.S. Cl. ........................ 385/24; 385/140; 385/10; 385/37; 359/341.3; 359/124; 359/127
(58) Field of Search ............................. 385/24, 140, 37, 385/10, 15, 14, 31, 16–23; 359/124, 127, 130, 341.3

(56) References Cited

U.S. PATENT DOCUMENTS

| | | | | |
|---|---|---|---|---|
| 5,815,299 A | * | 9/1998 | Bayart et al. | 359/124 X |
| 5,933,270 A | * | 8/1999 | Toyohara | 359/341.3 |
| 6,104,856 A | * | 8/2000 | Lampert | 385/140 |
| 6,148,124 A | * | 11/2000 | Aksyuk et al. | 385/24 |
| 6,240,222 B1 | * | 5/2001 | Bergmann | 385/24 |
| 6,363,202 B1 | * | 3/2002 | Goodfellow | 385/140 |

* cited by examiner

*Primary Examiner*—Phanh T. H. Palmer
(74) *Attorney, Agent, or Firm*—Fish & Richardson P.C.

(57) ABSTRACT

Devices that couple variable attenuators to a single WDM multiplexer to individually adjust and control the power levels of different WDM channels, e.g., substantially equalizing the power levels of the channels. Optical reflection and in-fiber variable attenuators are implemented to simplify the device structure and reduce cost.

29 Claims, 6 Drawing Sheets

WDM CHANNEL EQUALIZATION AND CONTROL

This application claims the benefit of U.S. Provisional Application No. 60/239,778 filed Oct. 11, 2000.

BACKGROUND

This application relates to optical fiber communication devices, and more particularly, to techniques and devices for signal processing in wavelength-division multiplexed fiber systems.

A wavelength-division multiplexed (WDM) fiber system can be used to transmit different channels of signals carried by optical carriers at different WDM wavelengths in a single fiber. Hence, the transmission capacity of a fiber link can be increased.

The power levels of different WDM channels, however, may be different from one another due to factors such as differences in the signal sources and transmission paths. This variation in signal strength of different WDM channels at a location in a fiber link may cause difficulties in a number of areas in the fiber system, including but not limited to, conditioning the signals during the transmission and relay, signal detection and data extraction. It is therefore desirable to implement devices in a fiber system to independently adjust the power levels of different WDM channels and thus to substantially equalize the signal strengths.

SUMMARY

This application includes devices that couple variable attenuators to a single WDM multiplexer to independently adjust and control power levels of individual WDM channels and to substantially equalize the power levels of different WDM channels if so desired. The structures of such devices are simple, compact, and may be manufactured at low cost.

One embodiment of the devices includes an input optical terminal, an optical multiplexer coupled to the input optical terminal, a plurality of variable attenuators, and a reflector. The input optical terminal is used to transmit a WDM signal having a plurality of optical signals at different WDM wavelengths. The optical multiplexer is adapted to have a plurality of output optical terminals and is operable to separate the optical signals at different WDM wavelengths into the output optical terminals, respectively.

The variable attenuators are respectively coupled in the output optical terminals to independently attenuate the optical signals in response to respective control signals so as to produce first attenuated signals. The optical reflector is coupled to the output optical terminals to receive and reflect the first attenuated signals back to the variable attenuators which generate second attenuated signals respectively traveling in the output terminals towards the optical multiplexer. The optical multiplexer is operable to combine the second attenuated signals to produce an attenuated WDM signal in the input optical terminal.

BRIEF DESCRIPTION OF THE DRAWINGS

Like reference symbols in the various drawings indicate like elements.

DETAILED DESCRIPTION

Figure 1:
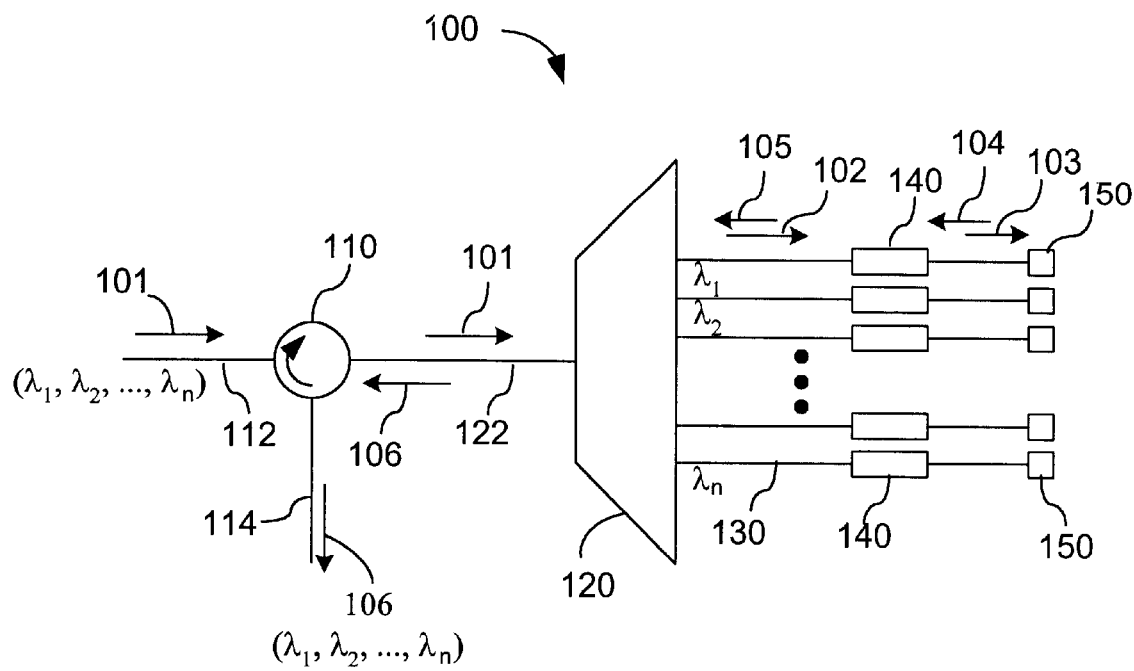
FIGS. 1 and 2 show exemplary embodiments of devices that adjust power levels of WDM channels based on a single WDM multiplexer and in-fiber variable attenuators.

FIG. 1 shows one exemplary device 100 that couples in-fiber variable attenuators 140 to a single WDM multiplexer 120 to independently adjust and thus to control the power levels of different WDM channels. This device may be used, for example, to substantially equalize the power levels of different WDM channels in various applications. The WDM multiplexer 120 has an input fiber terminal 122 to receive a WDM signal 101 that includes multiplexed WDM channels at different WDM wavelengths. The multiplexer 120 is designed to operate as both a demultiplexer and a multiplexer. To operate in a demultiplexing mode, the WDM signal 101 is fed into the input terminal 122 and the multiplexer is operable to separate the WDM channels to output individual WDM channels 102 in its output fiber terminals 130, one channel per fiber terminal. The multiplexer 120 is also designed to operate as a multiplexer when different WDM channels are fed into the terminals 130 on the right-hand side and are combined into the terminal 122 on the left-hand side as a multiplexed signal 106.

Each fiber terminal 130 on the right-hand side of the multiplexer 120 includes an in-fiber attenuator 140 and a reflector 150. The attenuator 140 is operable to independently attenuate the intensity of the optical signal passing therethrough in response to an external control signal. Hence, each individual signal 102 is attenuated for the first time by the attenuator 140 to become a first attenuated signal 103. The amount of attenuation is adjustable by properly controlling the attenuator 140. The reflector 150 reflects either the entirety or the majority of the signal 102 back as a reflected signal 104. Upon reflection, the signal 104 passes through the attenuator 140 for the second time and is attenuated again to merge as a second attenuated signal 105. The adjusted signals 105 are then combined by the multiplexer 120 to produce the adjusted output multiplexed signal 106. In applications where all WDM channels are desired to be equal in power, the attenuators 140 are properly controlled to make all of the second attenuated signals 105 approximately the same power.

An optical circulator 110 may be coupled to the fiber terminal 122 to manage the input and output signals 101 and 106. An input fiber 112 and an output fiber 114 may be coupled to the circulator 110 so that the signals are routed from fiber 112 to fiber 122, from fiber 122 to fiber 114, and from fiber 114 to fiber 112. The input signal 101 is received in the fiber 112 and the output signal 106 is sent out in the fiber 114.

Notably, the above device 100 uses the reflectors 150 to achieve a number of advantages. First, each signal 102 passes through its respective in-fiber attenuator 140 twice to double the amount of light attenuation. This can increase the range of attenuation and control sensitivity. Secondly, the reflective configuration allows the multiplexer 120 to perform both demultiplexing and multiplexing operations. Hence, only a single multiplexer is needed. In addition, the above reflective configuration has a simple structure and uses in-fiber components and hence allows for compact packaging at low cost and improved device liability.

The reflectors 150 may be implemented in a number of ways. For example, the distal end of each fiber 130 may be polished and coated with a reflective coating to provide a desired reflectivity. A reflective fiber grating may be formed in the fiber core to operate as the reflector 150. The fibers 130 may be bundled together and coupled to a single optical reflector 220 as illustrated in FIG. 2, where a collimating lens 210 may be coupled in each fiber.

Figure 2:
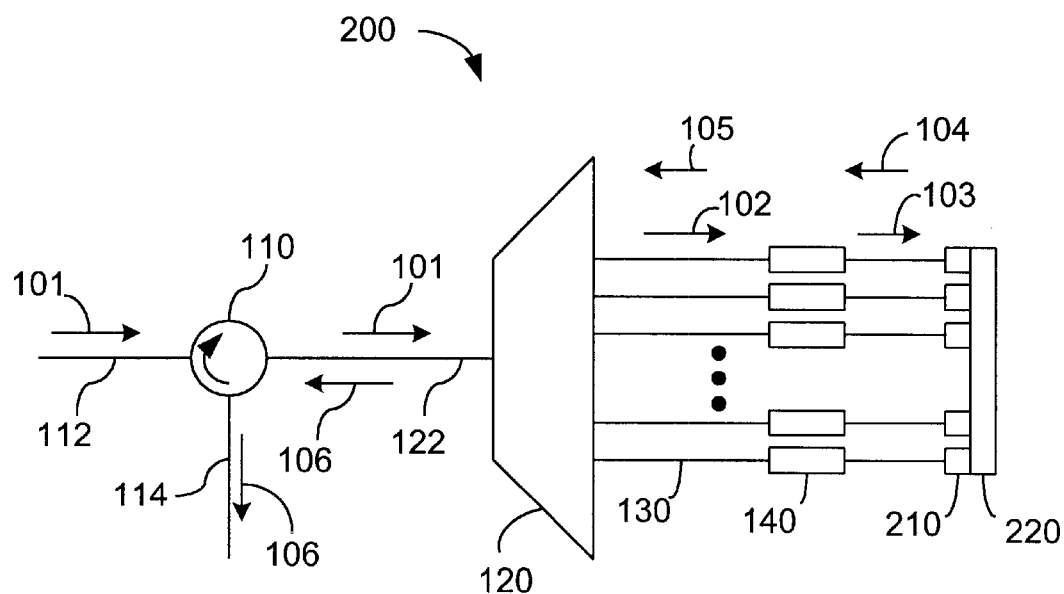

In particular, the Faraday rotation may be combined with the optical reflection to mitigate polarization-dependent loss in the devices of FIGS. 1 and 2. Polarization-dependent loss is known to exist in various optical devices and media, where optical signals with different optical polarizations experience different optical loss. Such loss can cause significant distortions in optical signals and hence is undesirable. In the devices in FIGS. 1 and 2, each component in the optical path of each optical signal may exhibit polarization-dependent loss, such as the WDM multiplexer 120, the fiber paths 122, 130, and the variable attenuators 140.

According to one aspect of the present application, each of the multiple reflectors 150 or the single reflector 220 may be designed to include a Faraday rotator so that the reflection is coupled with a polarization rotation. Each WDM channel passes through the Faraday rotator twice due to the reflection to have its polarization rotated so that each WDM channel goes through the optical path twice with different polarizations. This feature reduces the polarization-dependent loss in the device 100, e.g., in the multiplexer 120 and in the in-fiber attenuator 140, because the double passing with different polarizations can on average reduce the differences in the polarization-dependent loss amongst different polarizations. Notably, different from polarization rotation by a birefringent wave plate, the Faraday rotator ensures that the polarization is rotated by the desired amount caused by the double passing in each location along the optical path.

Figure 3A:
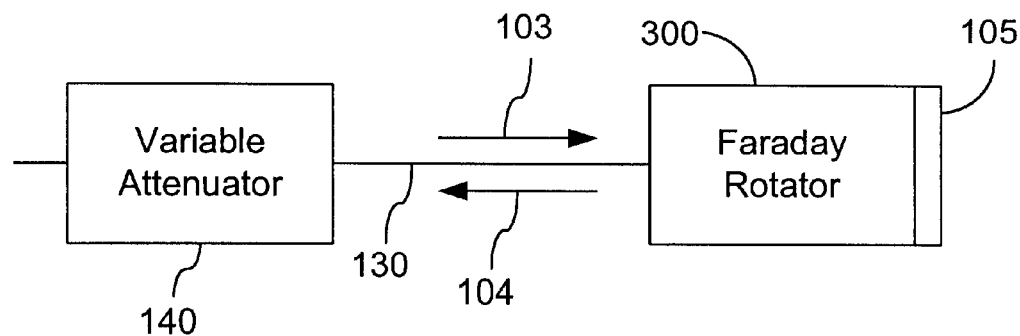
FIGS. 3A and 3B show implementation of Faraday rotators in the devices in FIGS. 1 and 2 to mitigate polarization-dependent loss.
Figure 3B:
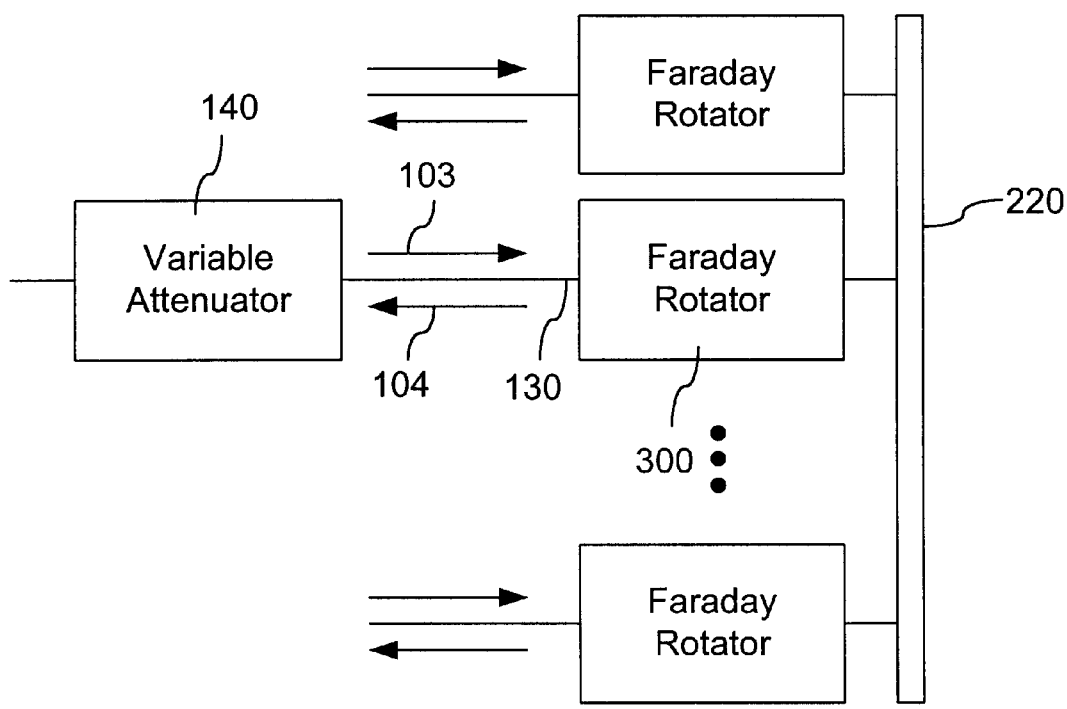

FIGS. 3A and 3B show exemplary locations of the Faraday rotators 300 in the devices shown in FIGS. 1 and 2, respectively, for implementing the above scheme for mitigating the polarization-dependent loss. In one implementation, each Faraday rotator 300 may be designed to produce a rotation of 45 degrees in polarization. Thus, a 90-degree rotation is produced in each reflected signal 104 after the double passing. As a result, the polarization of the reflected signal 104 is essentially orthogonal to the polarization before the reflection. This condition holds in every location along the optical path of the signal. Therefore, any polarization-dependent loss with respect to the two orthogonal polarizations is essentially eliminated. A reflector may be directly coupled to one end facet of the Faraday rotator 300 as shown in FIG. 3A or be spaced from the Faraday rotator 300.

Figure 4A:
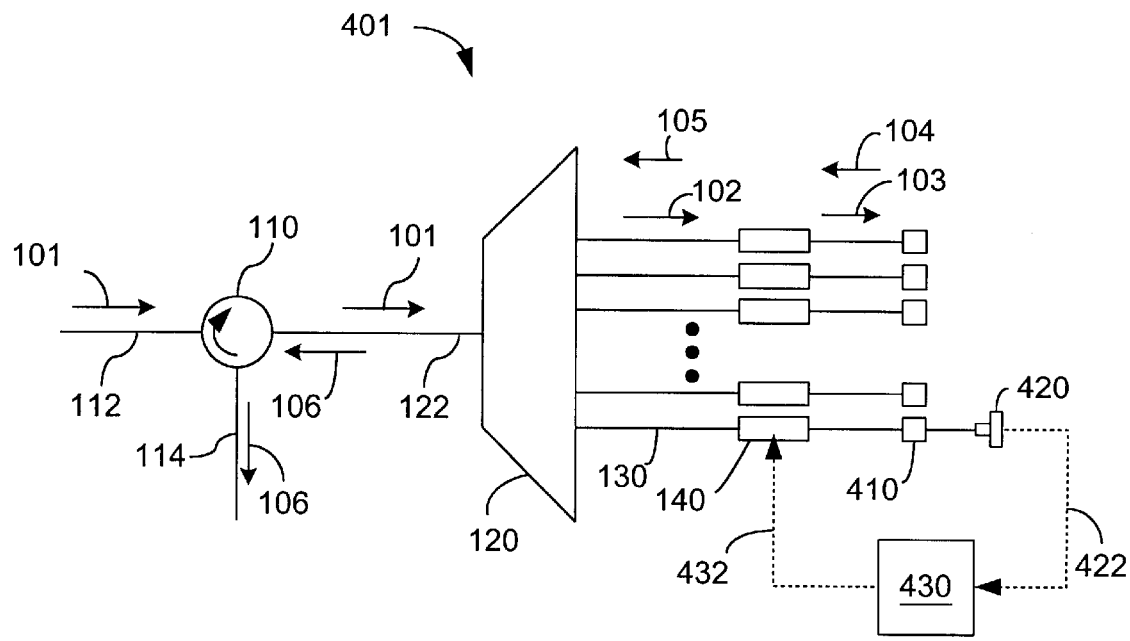
FIGS. 4A and 4B show two exemplary feedback configurations for actively control the variable attenuators in devices shown in FIGS. 1 and 2.

The in-fiber attenuator 140 is adjustable in response to an external control. Hence, a control mechanism may be implemented for each attenuator. FIG. 4A shows a device 401 based on the design in FIG. 1 that implements one embodiment of the control mechanism. Only one control loop for one attenuator is illustrated and similar control loops are implemented for different attenuators 140. Each fiber 130 uses a partial reflector 410 to reflect the majority of the signal 102, e.g., 99%, into the reflected signal 104 and to transmit a small fraction, e.g., 1%, to a photodetector 420. The output 422 of the photodetector 420 can be used to indicate the power level of the reflected signal 104. An attenuator control unit 430 is coupled to the photodetector 420 and is used to generate a control signal 432 in response to the detector output 422. This control signal 432 is then fed into the attenuator 140 to adjust the amount of light attenuation. As described above, the individual reflectors 410 may be replaced by a single reflector 220. In addition, a Faraday rotator may be used to reduce the polarization-dependent loss. The control unit 430 may include circuits for generating different control signals for different attenuators.

Figure 4B:
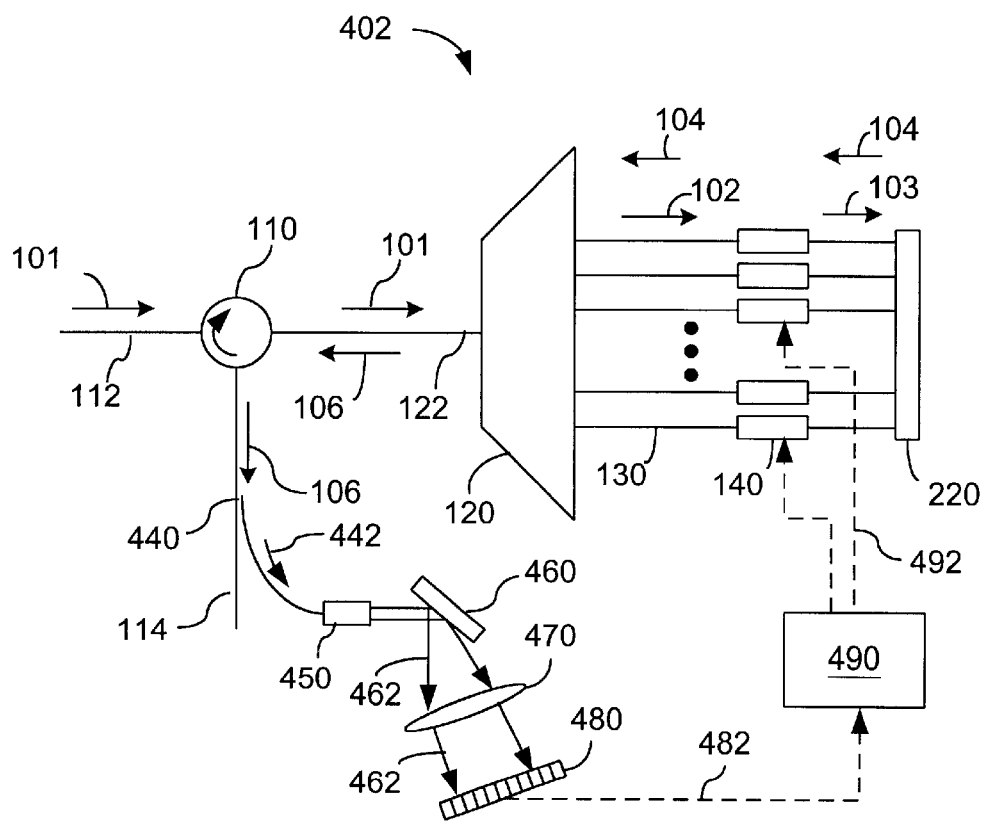

FIG. 4B shows a device 402 based on the design in FIG. 1 having another control feedback configuration. An optical coupler 440 is disposed in the output fiber 114 to tap a small fraction of the output signal 106. The taped signal 442, which includes all WDM channels, is then optically processed to separate the individual WDM channels. A photodetector array 480 is then used to respectively receive and measure the power levels of the separated WDM channels. A control unit 490 is coupled to the detector array 480 to receive the measured power levels and individually control the attenuators 140 via control signals 492. In the illustrated embodiment, a lens collimator 450 is used to collimate the tapped signal 442. A diffraction grating 460 is used and positioned to diffract the collimated signal 442 into separate WDM channels 462. A lens 470 collects the separate WDM channels 462 and focuses the signals 462 to their respective detectors in the array 480 which is placed at or near the focal plane of the lens 470.

Figure 5:
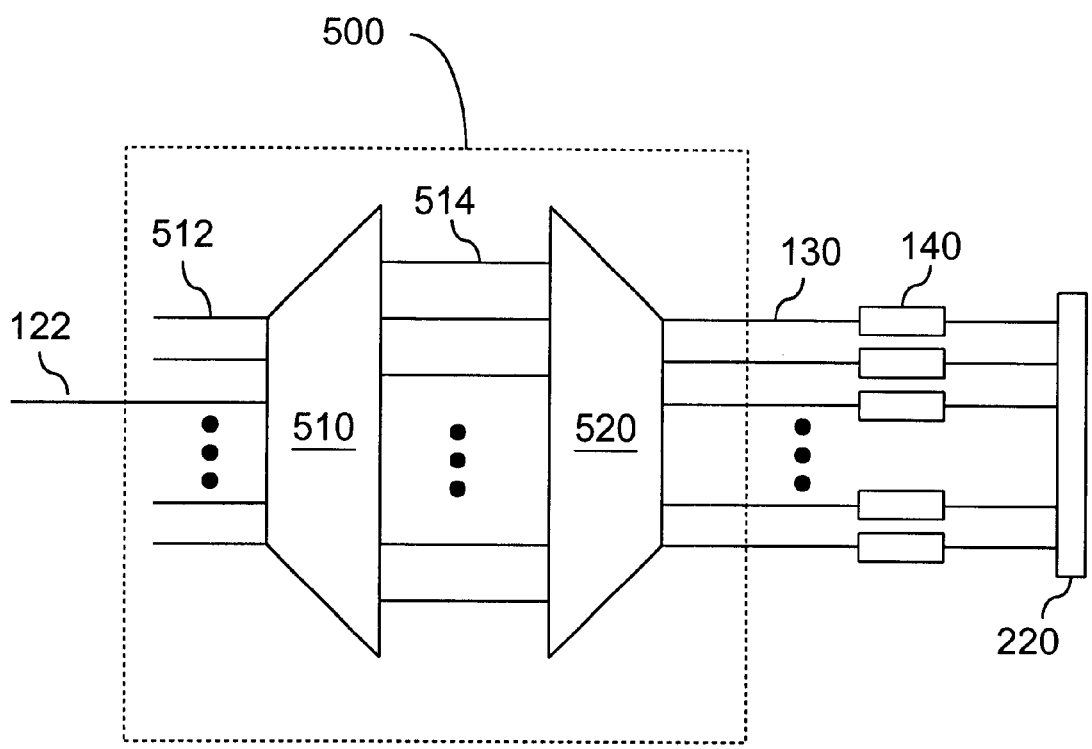
FIG. 5 shows an exemplary implementation of a WDM multiplexer based on an arrayed waveguide grating (AWG) device.

One implementation of the multiplexer 120 may be an arrayed waveguide grating (AWG). AWG devices are known. FIG. 5 shows one embodiment 500 as an example. The AWG 500 includes two optical couplers 510 and 520 that are interconnected by an array of waveguides 514. The coupler 510 is coupled to input waveguides 512 to receive input signals. One of the waveguides 512 may be used to function as the single input 122. The other coupler 520 is also coupled to multiple waveguides 130. The couplers 510, 520 and the waveguides 514 are specially designed so that different signal paths between the couplers 510 and 520 are phase shifted by different amounts. The input signal 101 in the fiber 122 is then split into the waveguides 514 where each waveguide has an identical copy of the input 101 as any other waveguide but produces a different phase shift. The interference at the coupler 520 then separates the different WDM channels into different output paths 130.

Each of the in-fiber attenuators 140 may also be implemented based on the fact that bending of a fiber can cause leakage of optical energy of a guided optical wave in the fiber core and hence reduce the power of the guided optical wave. The degree of leakage generally increases as the fiber bending increases and decreases as the fiber bending decreases. According to one embodiment of the present invention, the degree of the fiber bending can be controlled to adjust the amount of attenuation in the guided optical wave.

Figure 6:
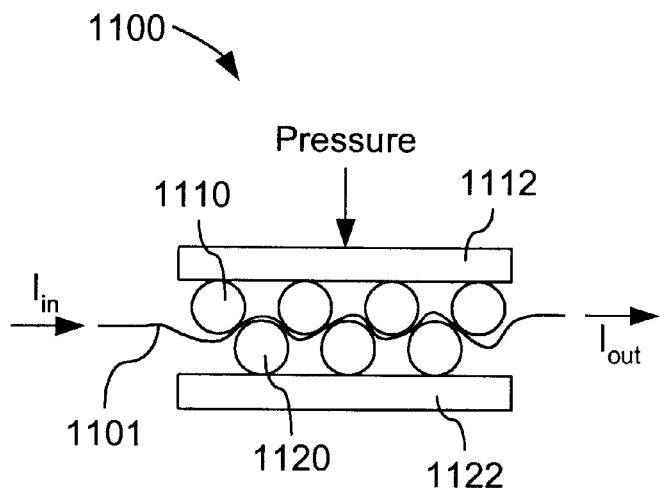
FIGS. 6, 7, 8, and 9 show examples of in-fiber variable attenuators based on light attenuation by fiber bending.

FIG. 6 shows one embodiment of a fiber variable optical attenuator 1100. This device 1100 includes a fiber 1101 and two sets of cylindrical rods 1110 and 1120 disposed on two opposite sides of the fiber 1101. Each set of rods (1110 or 1120) includes one or more rods that are positioned to contact the fiber 1101. Each rod on one side of the fiber 1101 is displaced from another rod on the opposite side along the fiber 1101 so that the opposite side of the fiber facing each rod is not in direct contact with another rod on the opposite side. As illustrated in FIG. 6, two adjacent rods 1110 on one side of the fiber 1101 are spaced from each other to leave a space where a rod 1110 on the opposite side is located and is in contact with the fiber 1101. Hence, when the two sets of rods 1110 and 1120 are pressed towards each other against the fiber 1101, the fiber 1101 is bent at each rod position. The guided optical wave in the fiber 1101, therefore, leaks out of the fiber 1101 at each bending position. This leakage reduces the amount of the guided wave that transmits through fiber 1101.

The relative position of the two sets of rods 1110 and 1120 can be controlled and adjusted to vary the amount of optical attenuation at a desired level. Each side of the fiber 1101 may have one rod or multiple rods. As the number of rods increases, the number of bending positions increases and therefore, a certain amount of attenuation can be achieved by having a less amount of bending at each bending position. Reduction of bending at each bending position is desirable to reduce the probability of damaging the fiber 1101 and to prolong the operating life of the device 1100. In addition, the number of bending positions in the fiber 1101 or the number of rods in each side can be set to achieve any desired amount of maximum optical attenuation.

Two rigid members 1112 and 1122 may be engaged to the two sets of rods 1110 and 1120 on the opposite sides of the fiber 1101, respectively, to control the relative position of the two sets of rods 1110 and 1120. The relative position of the members 1112 and 1122 may be changed to control the amount of bending. In one implementation as illustrated, the members 1112 and 1122 may be two plates. One or more motion actuators may be engaged to at least one of the plates 1112 and 1122 to apply a pressure which controls their relative position. This action, in turn, controls the pressure applied to the fiber 1101 by the rods 1110 and 1120 and thus controls the bending of the fiber 1101.

Figure 7:
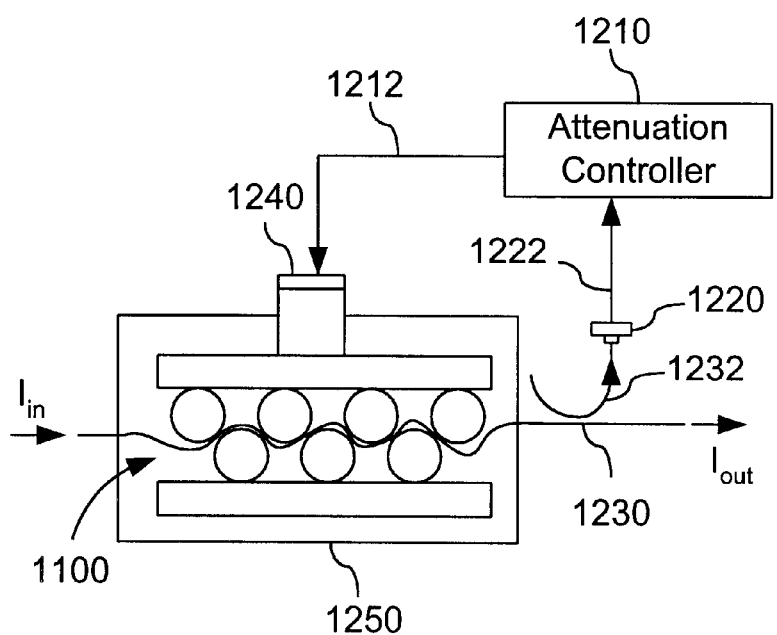

FIG. 7 shows that an attenuation controller 1210 is implemented to control the amount attenuation in the fiber attenuator 1100 shown in FIG. 6. The output terminal of the fiber 1101 is coupled to an optical coupler 1230 which splits a small amount, e.g., a few percent, of the output power as an output monitor signal 1232. A photodetector 1220 is used to receive and detect this output monitor signal 1232. The output 1222 of the photodetector 1220 is then fed into the attenuation controller 1210 to indicate the output power level of the fiber 1101.

An actuator 1240 is shown to engage to at least one of the members 1112 and 1122 to control the attenuation in the fiber 1101 by pressing the two sets of rods 1110 and 1120 towards one another against the fiber 1101. The actuator 1240 operates in response to a control signal 1212 produced by the controller 1210. The controller 1210 is designed to adjust a parameter of the control signal 1212 according to the output 1222 from the photodetector 1220 so that the amount of the attenuation caused by the fiber bending is set to maintain the output power from the fiber 1101 at a desired level.

In practical devices, an attenuator housing 1250 may be used to enclose at least the rods 1110, 1120 and the members 1112, 1122. The coupler 1230 and the photodetector 1220 may also be packaged to the housing 1250.

Figure 8:
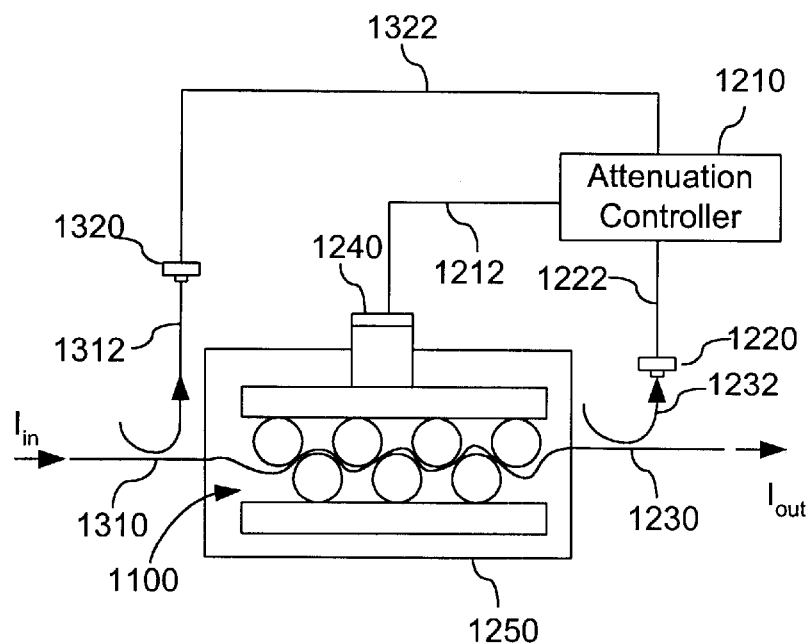

FIG. 8 shows that the attenuator in FIG. 7 can be modified to further include a second optical coupler 1310 at the input terminal of the fiber 1101. A small amount of input signal 1312 is split by the coupler 1310 to produce an input monitor signal 1312 while the majority of the input signal continues to travel in the fiber 1101 through the attenuation region where the rods 1110 and 1120 are located. A second photodetector 1320 is used to receive and detect the input monitor signal 1312 and to produce a respective detector signal 1322. The attenuator controller 1210 receives both the input and output monitor signals 1222 and 1322 to determine the attenuation ratio by Iout/Iin when the coupling strengths of the couplers 1310 and 1210 are known. The attenuator controller 1210 is designed to compare the measured attenuation ratio to a desired attenuation ratio to produce an error signal that represents the deviation. This error signal is then to produce the control signal 1212 that drives the actuator 1240 to reduce the deviation. This forms an active feedback control loop that controls the attenuation at a desired amount of percentage of the input signal. Hence, different from the system in FIG. 7 which controls the output at a fixed output level, the system in FIG. 8 can maintain a ratio of the input and output powers at a desired value when the input power fluctuates.

The actuator 1240 in general may be any suitable actuator that moves the relative position of the members 1112 and 1122 in a controlled manner. One example is a mechanical positioning element. A screw, for example, can be used to change the relative position of the members 1112 and 1122 by either manual control or a motor. Another example of the actuator 1240 is a piezo-electric transducer operating in response to a control voltage.

Figure 9:
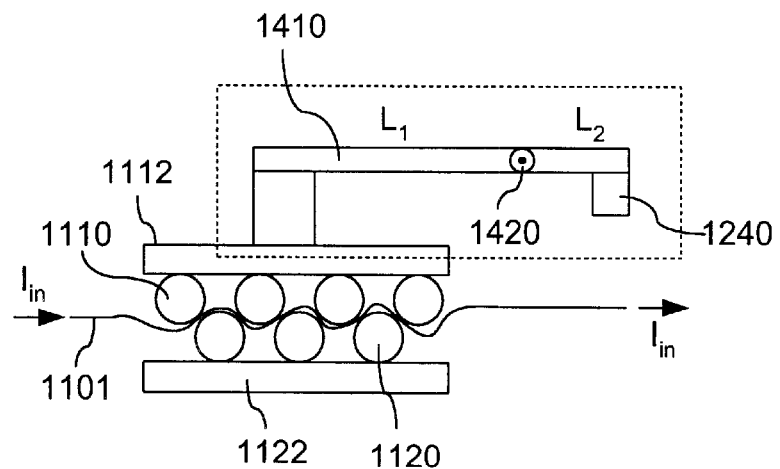

FIG. 9 shows a fiber attenuator 1400 that uses a level mechanism 1410 to enhance the amount of attenuation control of the actuator 1240. One end of the level 1410 is engaged to the actuator 1240 and the other side is engaged to the member 1112. The level 1410 has a pivot point 1420 that is positioned close to the actuator 1240 so that arm length L2 is less than arm length L1. Therefore, the amount of position change, d, produced by the actuator 1240, is amplified by a factor L1/L2 at the other end that engages to the member 1112. This level system may be useful when the amount of displacement of the actuator 1240 is limited. A piezo-electric actuator, for example, may be operated at control voltages by using this level mechanism to achieve sufficient control of the fiber bending when a high control voltage is undesirable.

The variable optical attenuators shown in FIGS. 6 through 9 may be modified. For example, the rods 1110 and 1120 may be in other shapes different from the cylindrical shape as shown and may be even replaced by other objects as long as proper bending can be achieved. Two separate actuators may be used to engage to the members 1112 and 1122, respectively, to change their relative position.

A number of embodiments have been described. Nevertheless, it will be understood that various modifications may be made. For example, although fibers are described in various embodiments, optical planar waveguides fabricated on a substrate or other optical waveguiding channels may also be used. For certain applications, the output WDM channels may be controlled at different levels. As another example, although a Faraday rotator is shown to be placed in the optical path of each separated WDM channel before the reflector, a single Faraday rotator may be used to rotate two or more separated WDM channels. All these are intended to be encompassed by the following claims.

What is claimed is:

1. A device, comprising:
   an input optical terminal to transmit a plurality of input optical signals at different wavelengths;
   an optical multiplexer coupled to said input optical terminal and adapted to have a plurality of output optical terminals to separate said input optical signals at different wavelengths into said output optical terminals, respectively;
   a plurality of variable attenuators respectively coupled in said output optical terminals to respectively attenuate said optical signals in response to respective control signals so as to produce first attenuated signals; and
   an optical reflector coupled to said output optical terminals to receive and reflect said first attenuated signals back to said variable attenuators which generate second attenuated signals respectively traveling in said output terminals towards said optical multiplexer, wherein said optical multiplexer combines said second attenuated signals into said input optical terminal as output signals.

2. The device as in claim 1, wherein each of said variable attenuators comprises:

a fiber adapted to guide an optical wave;

a first element placed on a first side of said fiber;

a second element placed on a second side of said fiber opposing said first side and displaced from said first element along said fiber; and an actuator coupled to at least one of said first and said second elements to change a relative position between said first and said second elements to bend said fiber to attenuate said optical wave.

3. The device as in claim 2, wherein each of said first and said second elements includes a cylindrical rod.

4. The device as in claim 2, wherein each of said first and said second elements includes a plurality of cylindrical rods to bend said fiber at a plurality of positions along said fiber.

5. The device as in claim 2 further including a controller to control said actuator in each of said variable attenuators.

6. The device as in claim 2, wherein said actuator includes a piezo element.

7. The device as in claim 2, wherein each of said variable attenuators further comprises a level mechanism coupled between said actuator and said at least one of said first and said second elements to amplify a movement of said actuator.

8. The device as in claim 1, further comprising:

a plurality of optical detectors coupled to respectively receive and detect optical signals that pass through respective variable attenuators at least once to produce detector signals; and an attenuator control unit coupled to said optical detectors and to supply said respective control signals in response to said detector signals, respectively.

9. The device as in claim 8, further comprising:

an optical coupler positioned in an optical path of said output signals to split factions of said output signals as monitor signals for said different wavelengths; and an optical element to receive said monitor signals to spatially separate said monitor signals, wherein said optical detectors respectively receive said separated monitor signals.

10. The device as in claim 9, wherein said optical element includes an optical grating.

11. The device as in claim 8, wherein said optical detectors are respectively coupled to receive monitor signals respectively split off said first attenuated signals.

12. The device as in claim 1, wherein said optical reflector includes a plurality of individual reflectors that are respectively coupled to said output optical terminals.

13. The device as in claim 12, wherein each individual reflector includes a reflective fiber grating.

14. The device as in claim 1, wherein said optical multiplexer includes an arrayed waveguide grating.

15. The device as in claim 1, further comprising:

an optical circulator coupled to said input optical terminal;

a first fiber coupled to said optical circulator to receive said input optical signals which are routed by said optical circulator into said input optical terminal; and a second fiber coupled to said optical circulator to receive said output signals from said input optical terminal via said optical circulator.

16. The device as in claim 1, further includes a Faraday rotator coupled between each of said variable attenuators and said optical reflector.

17. The device as in claim 1, wherein said input and output optical terminals include fibers.

18. The device as in claim 1, wherein said input and output optical terminals include waveguide fabricated on a substrate.

19. A method for controlling signal strengths of different WDM channels, comprising:

causing WDM channels in an input fiber to be coupled into a WDM multiplexer which separates said WDM channels;

causing separated WDM channels to be individually attenuated by independent variable attenuators;

causing separated WDM channels to be reflected back to said variable attenuators to undergo attenuation for a second time; and causing reflected WDM channels to be combined by said WDM multiplexer into said input fiber as output signals.

20. The method as in claim 19, further comprising causing a rotation of a polarization of each WDM channel based on the Faraday rotation at a location between the optical reflection and a corresponding variable attenuator to mitigate polarization-dependent loss.

21. The method as in claim 20, wherein a polarization of a reflected WDM channel is substantially orthogonal to the polarization of the WDM channel prior to the rotation and reflection.

22. The method as in claim 19, further comprising causing each variable attenuator to be controlled according to a power measurement of a fraction of a corresponding WDM channel that passes said variable attenuator at least once.

23. The method as in claim 19, wherein each variable attenuator attenuates by bending a fiber that carries a corresponding WDM channel.

24. The method as in claim 19, wherein said each separated WDM channel is attenuated by controlling a degree of bending of a fiber in which the separated WDM channel is confined.

25. A device, comprising:

an input optical terminal to transmit a plurality of input optical signals at different wavelengths;

an optical multiplexer coupled to said input optical terminal and adapted to have a plurality of output optical terminals to separate said input optical signals at different wavelengths into said output optical terminals, respectively;

a plurality of variable attenuators respectively coupled in said output optical terminals to respectively attenuate said optical signals in response to respective control signals so as to produce first attenuated signals;

means for causing a polarization rotation based on Faraday rotation in each of said first attenuated signals; and means for reflecting each of said first attenuated signals back to said means for causing Faraday rotation and to a respective variable attenuator to generate second attenuated signals respectively traveling in said output terminals towards said optical multiplexer, wherein said optical multiplexer combines said second attenuated signals into said input optical terminal as output signals.

26. The device as in claim 25, wherein said means for causing Faraday rotation rotates a polarization by 45 degrees by a single pass.

27. The device as in claim 25, wherein each of said first attenuated signals, after being reflected to pass through said means for causing Faraday rotation for a second time, has a polarization substantially orthogonal to a polarization of a corresponding first attenuated signal before initially reaching said means for causing Faraday rotation.

28. The device as in claim 25, wherein each variable attenuator includes:

a fiber for transmitting optical energy;

an element engaged to bend at least one location of said fiber to cause optical loss; and a controller coupled to said element to control a degree of bending in said fiber.

29. The device as in claim 25, further comprising a feedback control loop that is coupled to control a degree of attenuation in each variable attenuator in response to a measured attenuation caused by said each variable attenuator.

* * * * *